US007181626B1

(12) United States Patent
Rasmussen (10) Patent No.: US 7,181,626 B1
(45) Date of Patent: Feb. 20, 2007

(54) SMART CARD SECURITY FOR COMPUTER SYSTEM

(75) Inventor: Brian Rasmussen, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1017 days.

(21) Appl. No.: 09/895,530

(22) Filed: Jun. 29, 2001

(51) Int. Cl.
*G06F 17/00* (2006.01)

(52) U.S. Cl. .......................... 713/185; 726/9; 713/182

(58) Field of Classification Search ................ 713/185, 713/184, 182; 705/40, 44; 726/9, 20
See application file for complete search history.

(56) References Cited

U.S. PATENT DOCUMENTS 6,226,744 B1 * 5/2001 Murphy et al. ............. 713/200

OTHER PUBLICATIONS

Microsoft Windows NT Server, 1997, [Retrieved from Internet Feb. 22, 2005], http://fy.chalmers.se/~appro/nt/cooperswp.pdf.*
NT File System Security and Auditing, 1999, [Retrieved from Internet Feb. 22, 2005], http://net-services.ufl.edu/~security/itsa/nt-jodi.ppt.*
Windows 2000 Advanced Documentation, 2000, [Retrieved from Internet Feb. 22, 2005], http://www.microsoft.com/windows2000/en/advanced/help/.*
http://www.entrust.com/news/files/5312.htm.*
www.opengroup.org/rfc/mirrorrfc/rfc71.0txt.*
A multilayered architecture for the development of smart card-based healthcare applications; Georgoulas, A.; Giakoumaki, A.; Koutsouris, D.; Engineering in Medicine and Biology Society, 2003. Proceedings of the 25th Annual International Conference of the IEEE vol. 2, Sep. 17-21, 2003 pp. 1378-1381 vol. 2.*
Design and implementation of smartcard-based secure e-mail communication; Hsien-Hau Chen; Yung-Sheng Chen; Hsia-Ling Chiang; Chung-Huang Yang; Security Technology, 2003. Proceedings. IEEE 37th Annual 2003 International Carnahan Conference on Oct. 14-16, 2003 pp. 225-231.*
Microsoft open system logon with opensource PKI; Alberto, P.; Amedeo, T.; Andrea, V.; Information Technology Interfaces, 2003. ITI 2003. Proceedings of the 25th International Conference on Jun. 16-19, 2003 pp. 593-597.*

* cited by examiner

*Primary Examiner*—David Jung
(74) *Attorney, Agent, or Firm*—Osha Liang LLP (57) ABSTRACT

A computer security system utilizing smart cards for computer access. A system for home or small business use generally is presented in which smart cards are utilized to gain access to computer functions. The user is presented with a login prompt that permits login using the smart card. The user is permitted to bypass use of the smart card and obtain access to the computer system, but such use of the computer system is logged for review by an administrator.

19 Claims, 6 Drawing Sheets

```
INITIALIZE SMART CARD
First Name: [Sally]
Last Name: [        ]

○ Unrestricted Access      ☐ Can Initialize Smart Card
                           ☐ Can Clear Log
● Allow Access Only:       ☐ Can Disable Access Control
                           ☐ Can Turn Off Bypass Alert Between: [07:00]  [AM]
And:     [09:00]  [PM]

○ All Programs
● Select Programs From List ( OK )   ( CANCEL )   ( APPLY )
```

400

```
SELECT PROGRAMS:
☐ Word Processor
☐ Spreadsheet
☐ Stock Picker
☒ Rabbit Game
☐ Browser
☒ Checkers
☒ Chess
☐ Check Book
☐ Tax Calculator ( OK )
```

SMART CARD INITIALIZATION LOG

| Bill | unrestricted card | 6:00pm | 02/02/2001 |
| Joe | restricted card | 4:22pm | 02/02/2001 |
| Sally | restricted card | 4:26pm | 02/02/2001 |
| Jane | unrestricted card | 4:32pm | 02/02/2001 |
| Bill | access revoked | 6:00pm | 03/14/2001 |

600

EXIT

ACCESS LOG

700

| Sally | 3:00pm - 4:12pm | 04/15/2001 |
| Joe | 4:33pm - 4:58pm | 04/15/2001 |
| Jane | 6:32pm - 7:56pm | 04/15/2001 |
| BYPASSED | 9:22pm - 9:58pm | 04/15/2001 |
| Jane | 8:34am - 9:44pm | 04/16/2001 |
| DISABLED | | |
| UNKNOWN | 2:30pm - 3:04pm | 04/16/2001 |
| UNKNOWN | 3:08pm - 3:43pm | 04/16/2001 |
| ENABLED | | |
| Joe | 4:37pm - 5:35pm | 04/16/2001 |

616, 620, 634, 638, 630, 608

EXIT

SMART CARD SECURITY FOR COMPUTER SYSTEM

FIELD OF THE INVENTION

This invention relates generally to the field of computer security. More particularly, this invention relates to a smart card-based computer access system with logging of user activity.

BACKGROUND OF THE INVENTION

When personal computers are utilized in a home environment or small office environment, it is often desirable to impose some measure of security and/or parental control over use of the computer. Generally, the security requirements for such an environment are dramatically less than those for larger business enterprises and government computer systems. Moreover, the level of sophistication of the user in a home computer environment or small business computer environment varies greatly, as does the availability of high quality, responsive technical support. Accordingly, it is desirable that in such environments the level of security not be so overwhelming as to prevent the owner of the computer system from being able to overcome the security measures and access computer information. But, it is equally important that such use be detectable as a parental oversight or security measure.

SUMMARY OF THE INVENTION

The present invention relates generally to computer security. Objects, advantages and features of the invention will become apparent to those skilled in the art upon consideration of the following detailed description of the invention.

In one embodiment of the present invention a computer security system utilizes smart cards for computer access. A system for home or small business use generally is presented in which smart cards are utilized to gain access to computer functions. The user is presented with a login prompt that permits login using the smart card. The user is permitted to bypass use of the smart card and obtain access to the computer system, but such use of the computer system is logged for review by an administrator. Such an arrangement has the advantage that the user is able to log in without the smart card if need be, but such use can be detected by an administrator (e.g., a parent).

A method of controlling access to a computer system consistent with an embodiment of the present invention includes receiving a request to log into the computer system; determining if a smart card is being used as a part of a login protocol to log in to the computer system; if so, permitting use of the computer system and logging use of the computer system for the user associated with the smart card; and if not, permitting use of the computer system and logging use of the computer system to an unknown user.

Instructions for execution on a programmed processor can be stored in any suitable computer readable storage medium for carrying out the above method.

A computer system having an access control system consistent with an embodiment of the present invention has a central processor and a smart card reader accessible by the central processor. A security program runs on the central processor that: determines if a smart card is being used as a part of a login protocol to log in to the computer system; if so, permits use of the computer system and logs use of the computer system for the user associated with the smart card; and if not, permits use of the computer system and logs use of the computer system to an unknown user.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "timing" or "presenting" or "determining" or "logging" or "displaying" or "permitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Smart Card Security for Computer System in Accordance with the Invention

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 1:
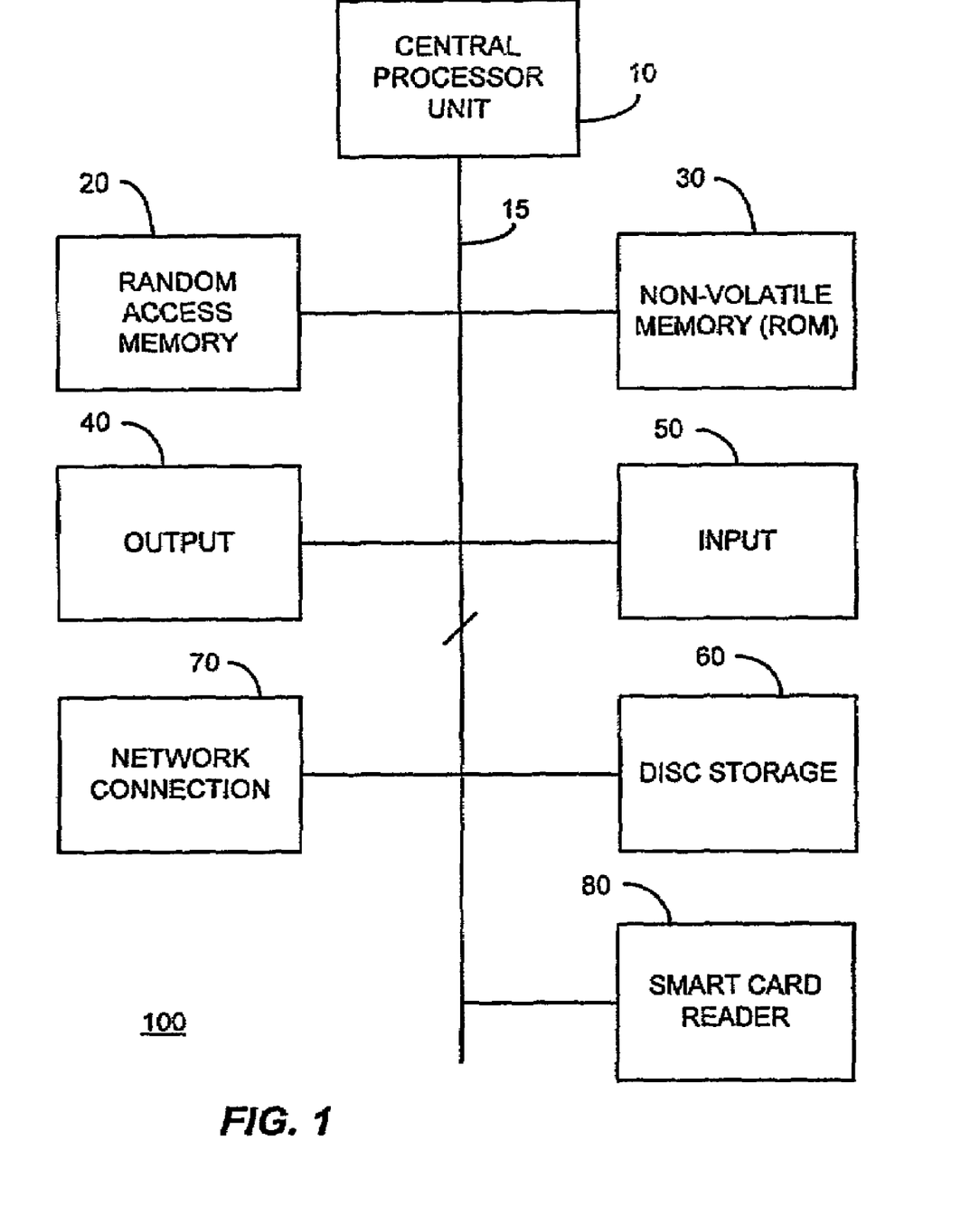
FIG. 1 is a block diagram showing a computer system suitable for implementation of an embodiment of the present security system.

A computer system suitable for implementing the present invention is depicted in FIG. 1 as 100. Computer system 100 includes a central processor unit (CPU) 10 with an associated bus 15 used to connect the central processor unit 10 to Random Access Memory 20 and Non-Volatile Memory 30 in a known manner. An output mechanism at 40 may be provided in order to display or print output for the computer administrator. Similarly, input devices such as keyboard and mouse 50 may be provided for the input of information from the computer administrator. Computer 100 also may include disc storage 60 for storing large amounts of information as required. Computer system 100 may be coupled to a computer network using a network connection 70 such as an Ethernet adapter. System 100 may also include a modem or other access device (not shown) for connection to the Internet. In accordance with the present invention, computer 100 also has a smart card reader 80, either as an internal or externally connected device, that reads smart cards as an access control mechanism. In addition to the components shown, the computer system 100 may also be connected to various other printing, scanning and communication devices.

Smart card reader 80 reads smart card devices which are generally credit card type devices incorporating some form of computer readable storage device and, preferably, a computer processor. However, for purposes of this invention, a smart card may be considered to be any form of identification device that can be readily carried by the user and contains computer readable information storage media that can be adapted to the computer security methods and apparatus described herein.

The computer system 100 operates in conjunction with an operating system such as one of the Windows™ operating systems available from Microsoft, Corp., Redmond, Wash., to permit users to carry out various operations including word processing, database operations, games, etc. The present invention is carried out in a security program operating in conjunction with, or as a part of, the operating system. Computer readable instructions for carrying out the processes of the present invention can be stored on the disc storage 60 or any other suitable computer readable storage medium.

In a home computer system incorporating a computing device such as that illustrated as computer system 100 of FIG. 1, it may be desirable to exercise security measures and parental control utilizing a smart card device in a manner which provides oversight and restricted access without overwhelming the users.

Figure 2:
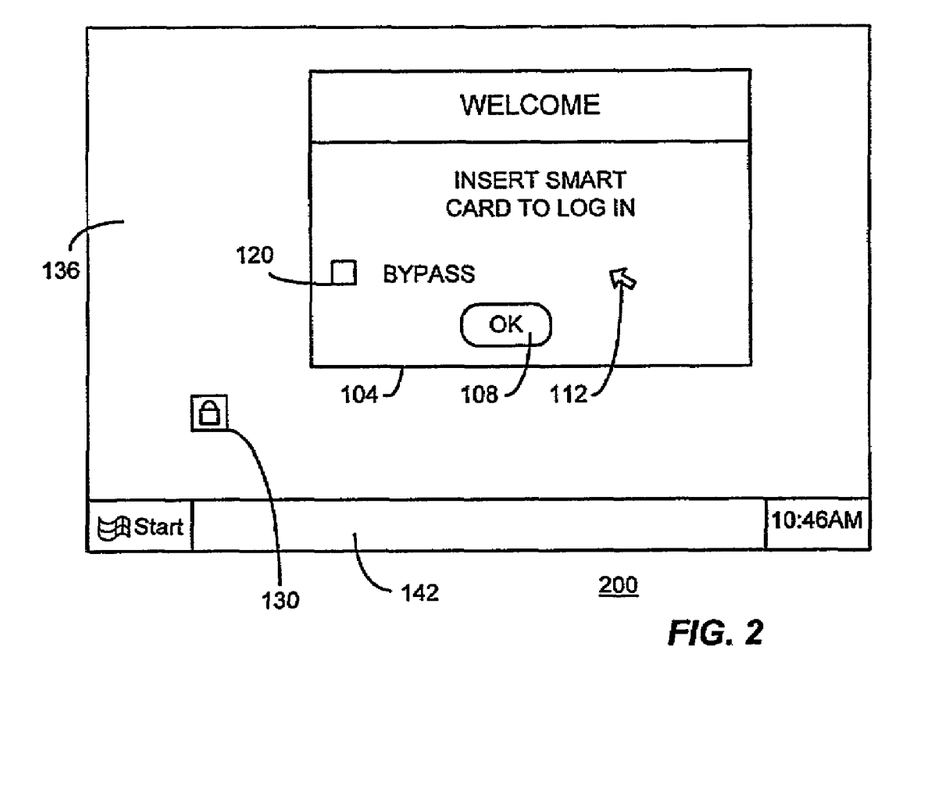
FIG. 2 depicts an exemplary opening screen consistent with one embodiment of the present invention.

When computer system 100 is booted, in accordance with an embodiment of the present invention, and there is no user logged into the computer system, the computer system may present a screen image similar to exemplary image 200 of FIG. 2. Image 200 includes a window 104 that welcomes the user to log in by inserting a smart card in smart card reader 80. Once the user has inserted the smart card into smart card reader 80, the "OK" button 108 is selected or pointed to with cursor or pointer 112 and the user clicks a mouse button to log in. At this point, a login is conducted by the computer system CPU, by using a suitable login protocol including reading the information on the smart card using smart card reader 80. The user identified by the smart card inserted into smart card reader 80 is then permitted access to the computer resources in accordance with whatever access privileges have been designated for the user of the smart card.

In accordance with a feature of embodiments of the present invention, a user without a smart card or who has lost his smart card may still log into the computer System by first checking the bypass box 120 and then selecting the "OK" button 108. This permits the user to still access the computer without a smart card, but creates a log of that use that can be inspected and investigated if necessary by the user that administers use of the smart cards and the computer system. In this manner, a user is never prohibited access to the computer system, but access to the computer system without use of the smart card is logged and can therefore be investigated. By way of example, in a family computer system, with the family consisting of two parents and a child, use of the computer system by the child without his or her smart card will appear in an access log as an unknown user. The parents can readily determine, in general, which of the three approved users have accessed the computer system without the smart card. Appropriate measures can then be taken to address any parental issues arising from a child making unauthorized use of the computer. Thus, the present invention provides for a measure of parental control over a child's use of the computer.

In accordance with an embodiment of the invention, an icon 130 may appear on the computer screen either in the working area of the computer screen, the control area of the computer screen 136 or on a control bar 142 of the computer screen that can be used after logging in to access various features of the smart card and access administration in accordance with the present invention. In one embodiment, icon 130 is also used as an alert to bring to the attention of the administrator that a bypassed access to the computer system has taken place. In this embodiment, a visual attribute of the icon 130 may be modified to alert the computer administrator to the fact that the computer has been accessed by a bypass. In one embodiment, the colors of icon 130 can be changed or other visual attributes about the icon can change. Other examples of changing visual attributes of icon 130 include animating the icon or causing the icon to flash. Those skilled in the art will appreciate that this is actually accomplished not by changing the attribute of the icon itself but by substituting a different icon file for the normal icon file. Similarly, flashing icons or moving GIF icons can be utilized to bring a bypassed login to the attention of the administrator.

Figure 3:
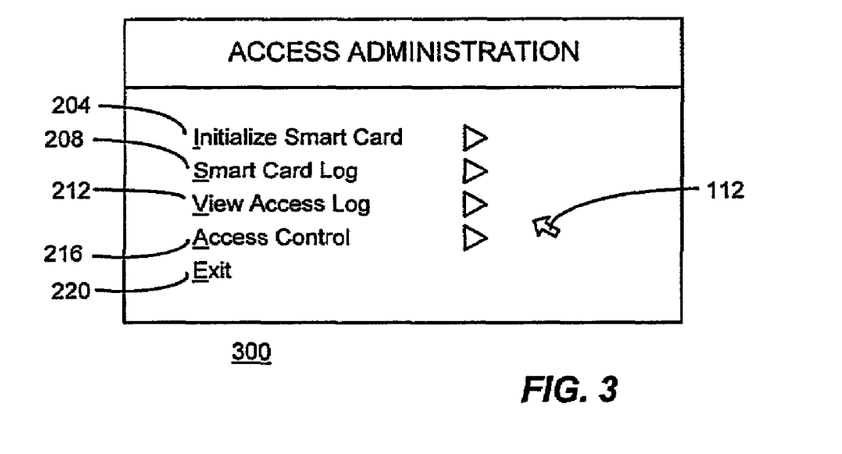
FIG. 3 depicts an exemplary access administration menu consistent with one embodiment of the present invention.

In accordance with one embodiment of the present invention, after the user has logged in with a smart card, and the system determines that the user has administrative rights, the user may select icon 130 or select to administer access rights from a program menu (or using any other conventional mechanism for launching a program) can obtain a menu of access administration features at an access administration menu 300 as illustrated in FIG. 3. This exemplary menu gives the user the choice of initializing a smart card at 204, viewing the smart card log at 208, viewing an access log for determining which users have accessed the computer system at 212, entering an access control menu at 216 or exiting at 220. Launching any of these activities is accomplished by pointing to the selection with pointer 112 and clicking, or striking the first character of the menu selection from the keyboard in a conventional manner. In the case of selections 204, 208, 212 and 216, the arrow heads to the right of the selection indicate that a new window will appear when that item is selected.

Figure 4:
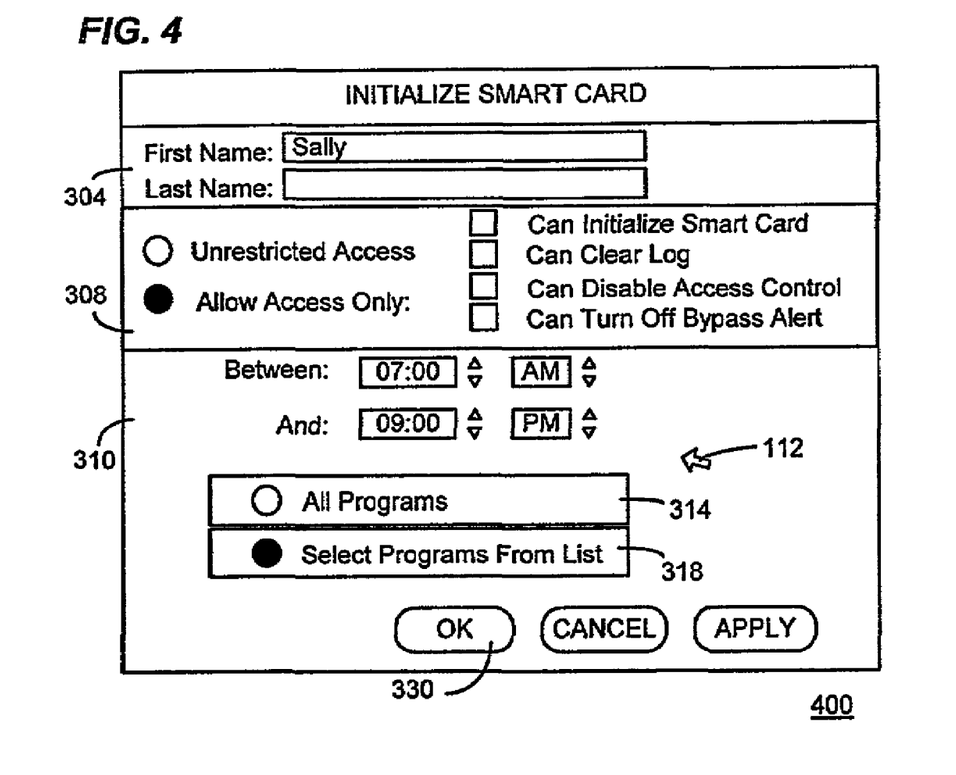
FIG. 4 depicts an exemplary smart card initialization screen consistent with one embodiment of the present invention.

If the user elects to initialize a smart card (or otherwise adjust the administration of a smart card) by selecting menu selection 204, the user is taken to the smart card initialization window 400. This window may include a name identification region 304 where the administrator types the name of the user. In region 308, the administrator can determine some of the users rights, such as the users right to initialize the smart card, clear a log, disable access control and turn off (reset) the bypass alert indicator (i.e., the flashing icon 130.) In addition, the user can determine whether unrestricted access is permitted or whether controls over access times and programs are to be instituted. If the administrator selects "allow access only:", the user then fills in a time range in region 310 during which the new user is permitted access to the computer system. The administrator can also determine that the user is permitted to access all programs at 314 or a restricted set of programs at 318 that are selected from a list.

Figure 5:
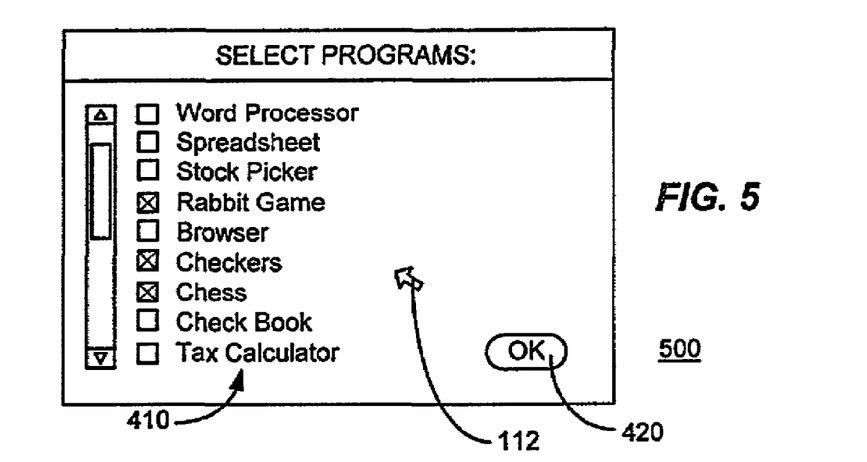
FIG. 5 depicts an exemplary program selection window consistent with one embodiment of the present invention.

FIG. 5 illustrates an exemplary program selection list 500 used to select from available executable programs those which the current user is permitted to access. Window 500 appears when selection 318 is selected and the user scrolls through a list of programs that can be selected by pointer 112 and a mouse button to determine which programs the user is permitted to access. When the administrator clicks the "OK" button 420, the user returns to window 400. When the process is completed, the administrator clicks the "OK" button 330 and is led through a sequence of steps to program the smart card. For example, the user will then receive a window instructing the user to insert a new smart card into smart card reader 80, the smart card is then programmed by the computer and the user may be instructed to remove the smart card and replace it with his or her own smart card. Thus, a smart card can be initialized or reprogrammed using the initialized smart card selection 204 of menu 300.

Figure 6:
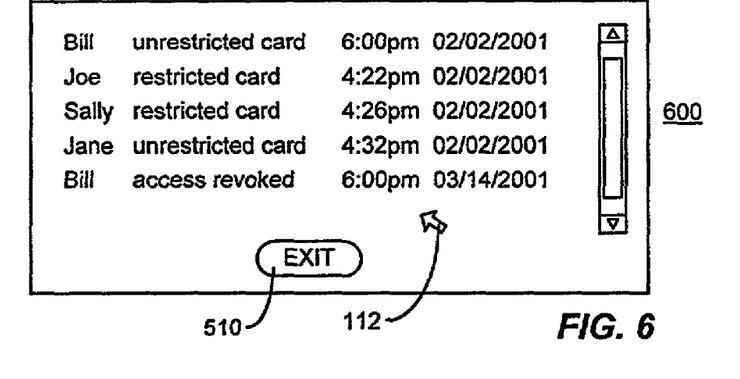
FIG. 6 depicts an exemplary smart card initialization log screen consistent with one embodiment of the present invention.

When a user with administration privileges wishes to see the smart card log, selection 208 is selected from menu 300 and the administrator is taken to exemplary window 600 of FIG. 6. This window shows a list of all activity in initializing or modifying or revoking a smart card. The administrator can select any of the users listed on the smart card initialization log by placing the pointer 112 over the users log entry and clicking the mouse. This takes the user to a screen that details the rights associated with that user and/or changes that were made in the particular log entry. Log entries can be scrolled for viewing larger numbers of log entries in a conventional manner. When the user wishes to return to the access administration menu 300 the "Exit" button 510 is operated.

If the user wishes to view the access log, selection 212 is made from the access administration menu 300. This results in window 700 of FIG. 7 being displayed on the computer system display. This access log provides a listing of all times and users that have accessed the computer system. Whenever a user logs in using their smart card, an entry such as 608 is created. Entry 608 shows that a user named Joe accessed the computer system from 4:37 pm to 5:35 pm on Apr. 16, 2001. In certain embodiments of the invention, by clicking on the log entry using pointer 112 and the mouse button, more detailed information may be available such as what programs were accessed during this time period. In other embodiments, only a log of use of the computer in some manner is provided. Whenever the computer is accessed without using the smart card by selecting by selecting bypass selection 120 as illustrated in FIG. 2, an entry such as 616 is created to show that a bypassed access to the computer system occurred between 9:22 pm and 9:58 pm on Apr. 15, 2001. In this event, the entry is logged as bypassed which indicates that the user is unknown to the computer system but the entry was made without benefit of a smart card.

Figure 7:
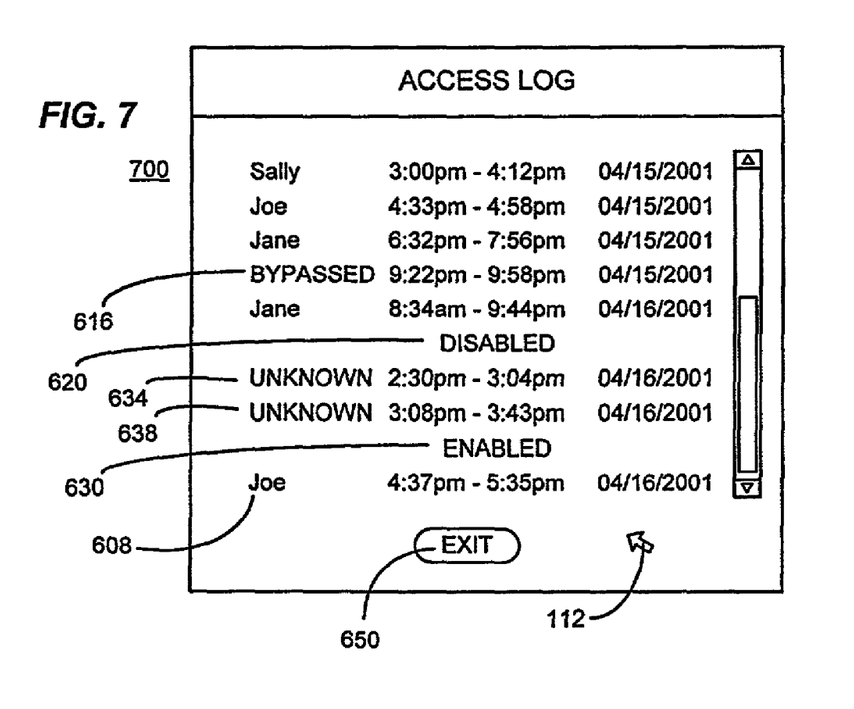
FIG. 7 depicts an exemplary access log screen consistent with one embodiment of the present invention.
Figure 8:
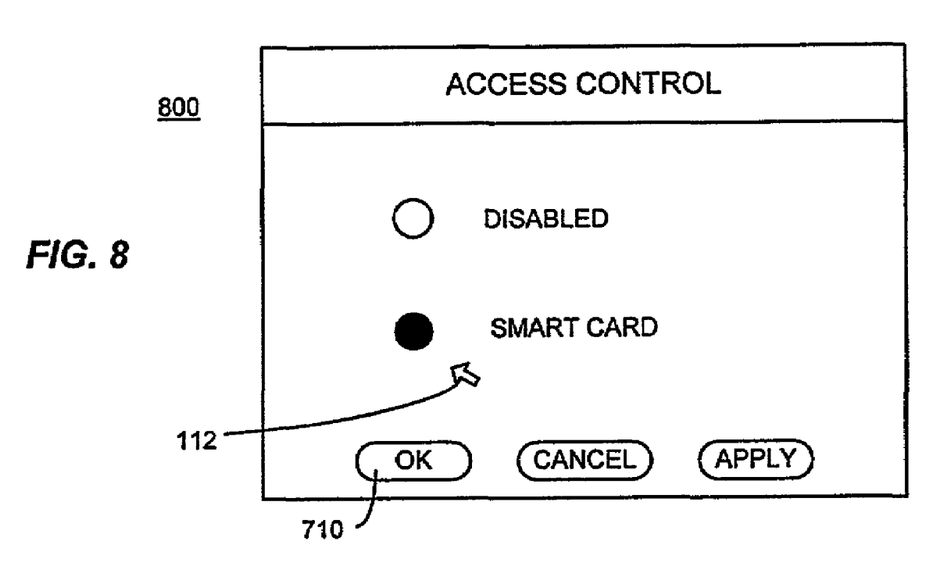
FIG. 8 depicts an exemplary shut down counter screen consistent with one embodiment of the present invention.

If a user has administrative privileges that permit disabling the access control, the disabling and re-enabling of the access control is also logged as shown by an entry stating that the system was disabled such as 620 and enabled such as 630. During the time period that the access control was disabled, the system continues to log uses of the computer as unnamed users as illustrated by entries 634 and 638. When the administrator wishes to leave the access log, this is accomplished by clicking the "Exit" button 650. If the user selects access control selection 216 from menu 300 of FIG. 3, and the user has privileges for access control; the user is taken to menu 800 of FIG. 8. In this menu, the user can elect to either enable the smart card access control or disable it. The user can then return to the access administration menu 300 by selection of "OK" button 710. Selection 220 from access administration menu 300 of FIG. 3 exits the access administration menu.

In order to assure that a single user does not simply login and leave the computer unattended for large periods of time permitting uncontrolled access to the computer, a timer is set whenever a user logs in. This timer can be, for example, a 10-minute timer, but this is not to be limiting. In this example, when there has been no screen activity for a period of time (e.g. 5 minutes) a shut down warning message such as message 900 of FIG. 9 appears on the screen to warn the user that he will be automatically logged out in 5 minutes. The window then may count down the time until the log out will occur. At the end of the count down, an automatic log out procedure is carried out including closing down all currently opened files and programs to prevent malfunctioning of those programs the next time they are used. In order to regain access to the computer system, the user simply logs in again as illustrated in FIG. 2.

Whenever the icon 130 indicates that a bypassed login has taken place, a user with the privilege of turning off the bypass alert can observe that a bypassed login has taken place and can turn off the alert in any number of manners. For example, the art of logging in itself may be used to turn off the bypass alert. In other examples, an authorized user can click on icon 130 and before being presented with an access administration window 300 can be given the option to turn off the bypass alert. In other embodiments, using a second button on the mouse to click on icon 130 can give the option of turning off the alert. Those skilled in the art will appreciate many mechanisms for accomplishing the turning off of the bypass alert. Similarly, users that are permitted to clear a log may do so using similar techniques such as invoking a menu from the log window in some manner or invoking a window from an icon or program control menu. Those skilled in the art will appreciate that the specific manner of operation illustrated should not be considered limiting since many other mechanisms for access control consistent with the present invention can be utilized and such techniques are considered implementation details for purposes of this discussion.

Figure 10:
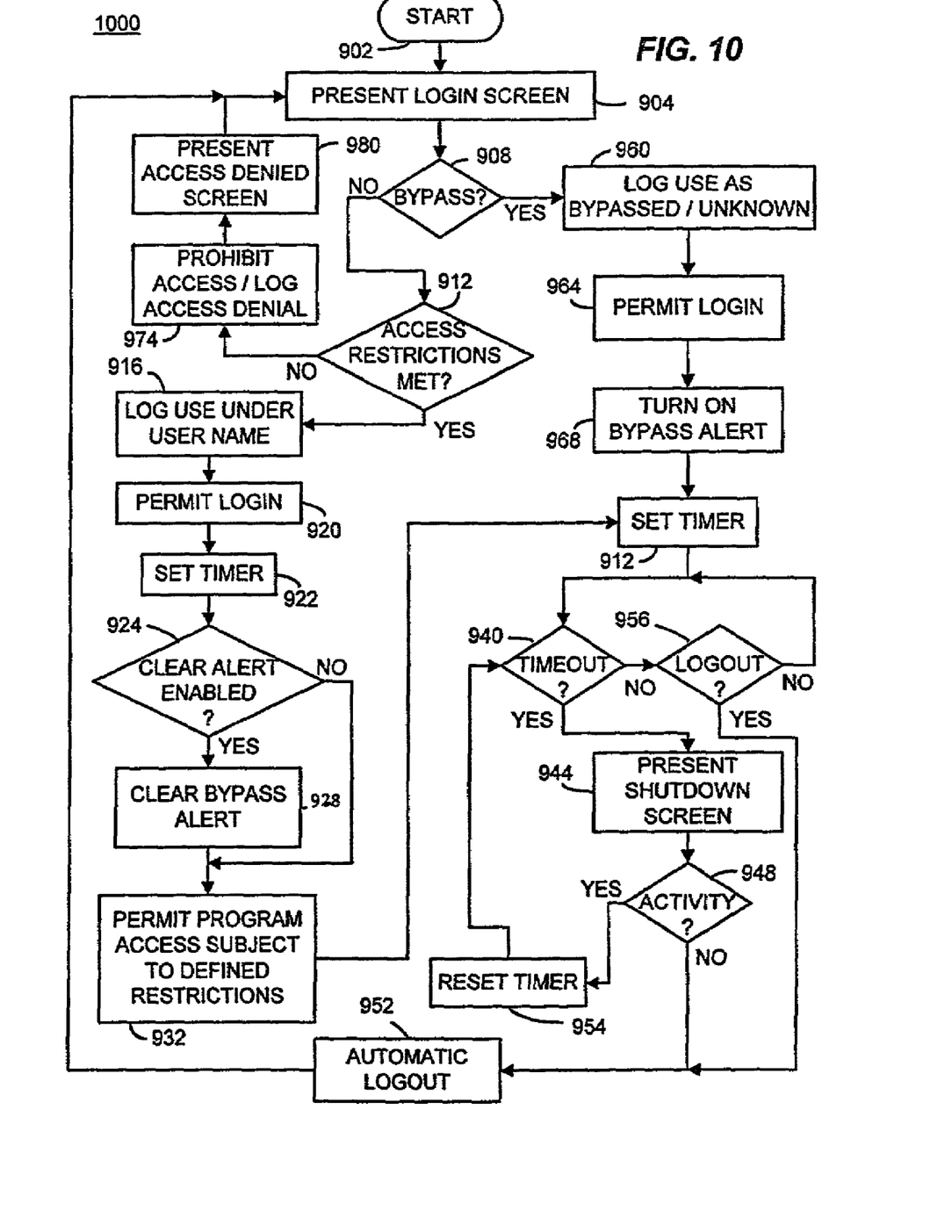
FIG. 10 is a flow chart of the basic operational flow of an embodiment consistent with the present invention.

Referring now to FIG. 10, a process 1000 is illustrated starting at 902 for the basic operation of the present access control system. In accordance with process 1000, the system first presents a login screen 200 to the user at 904. If bypass is not selected from this login screen at 908, the system inspects the smart card in the system for the user attempting to login and determines what that users access restrictions are at 912. Access restrictions may include time of day or other access restrictions. If those access restrictions are met at 912, then the user is logged in and that login activity is logged under the user name at 916. The system then permits the login at 920 in accordance with any restrictions associated with the user. At 922 the timer is set for timing inactivity of the computers user.

In the event the user is permitted to clear an access alert, in one embodiment the user is presented with the option of clearing that alert at 924. If the user is enabled to clear that alert and elects to do so, the alert is cleared at 928. Otherwise, the clearing of the alert at 928 is bypassed and the user is permitted access to programs residing on the computer at 932 in accordance with restrictions defined for that particular user smart card.

Figure 9:
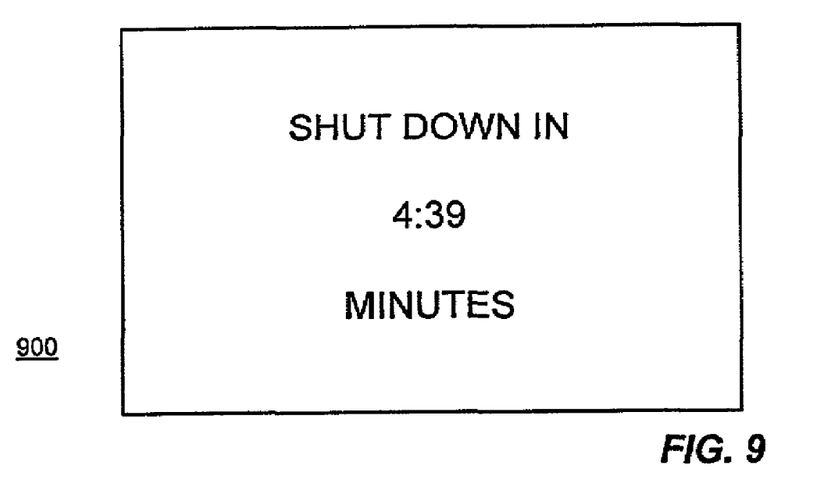
FIG. 9 depicts an exemplary access control screen consistent with one embodiment of the present invention.

During the conventional program access at 932, the timer is periodically inspected to determine if a time out has occurred at 940. If so, the user is presented with a shutdown screen 900 at 944 and if no activity occurs at 948 the automatic shutdown is carried out at 952. Also, if the user initiates a shutdown or logout at 956 control passes to 952 where programs and data are saved to prevent loss of information or malfunction as previously described. In the event activity occurs (e.g., keyboard or mouse activity) at 948 the timer is reset at 954 and control returns to 940. During the timer activity, the user can simultaneously carry out other computer functions with the timing taking place in the background.

In the event at 908, the user chooses to login by bypassing use of the smart card, that use is logged at 960 as a bypassed user (i.e., an unnamed user) and the login is permitted at 964. At 968 the bypass alert is turned on and the timer is set at 972. Control then passes to 940 to determine if a time out has occurred.

In the event access restrictions are not met at 912, the user is prohibited access at 974 and denial of access is logged in the access log 700. A screen is presented to the user indicating that access has been denied at 980 and then the login screen 200 is presented again at 904. Those skilled in the art will appreciate that many variations on this process are possible and that this process is only presented as an overview of the general workings of the current invention with further details being considered implementation Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form, and that can be stored in any suitable electronic storage medium or that can be transmitted over any electronic communication medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of controlling access to a computer system, comprising:
   receiving a request to log into the computer system, wherein the request is associated with a first log in window;
   determining if a smart card is being used as a part of a login protocol to log in to the computer system;
   if the smart card is being used, permitting use of the computer system based on access restrictions embedded on the smart card and logging use of the computer for the user associated with the smart card; and
   if the smart card is not being used, permitting use of the computer system, logging use of the computer system to an unknown user, and setting an alert on the computer system, wherein the alert is associated with a second log in window.

2. The method according to claim 1, wherein the alert comprises changing a visual appearance of an icon.

3. The method according to claim 1, further comprising clearing the alert if the user associated with the smart card has rights to clear alerts when the smart card is being used as a part of the login protocol.

4. The method according to claim 1, further comprising determining an access restriction associated with a user associated with the smart card and permitting use of the computer system subject to the access restriction when the smart card is being used as a part of the login protocol.

5. The method according to claim 4, further comprising denying access to the computer system when the access restriction is not met.

6. The method according to claim 4, wherein the access restriction comprises restriction of time of day that use of the computer system is permitted.

7. The method according to claim 4, wherein the access restriction comprises restriction of computer programs that can be executed on the computer system.

8. The method according to claim 1, further comprising:
setting a timer to measure a time period whenever use of the computer system is permitted;
resetting the timer when the computer system is actively being used; and
carrying out an automatic logout when the computer system has not been actively used during the time period.

9. The method according to claim 1, further comprising permitting initialization of a smart card if the user associated with the smart card has rights to initialize a smart card, when the smart card is being used as a part of the login protocol.

10. The method according to claim 9, wherein the initialization further comprises establishing access restriction for a user of the smart card.

11. The method according to claim 1, wherein the use logging comprises making entries into a log file of a user name, time and date of the computer system use.

12. The method according to claim 11, wherein the use slogging further comprises making entries into the log file of computer programs accessed.

13. A computer readable storage medium storing instructions that, when executed on a programmed processor, carry out the method according to claim 1.

14. A method of controlling access to a computer system, comprising:
receiving a request to log into the computer system, wherein the request is associated with a first login window;
determining if a smart card is being used as a part of a login protocol to log in to the computer system;
if the smart card is being used, permitting use of the computer system based on access restrictions embedded on the smart card and logging use of the computer for the user associated with the smart card; and
if the smart card is not being used, permitting use of the computer system, logging use of the computer system to an unknown user, and setting an alert on the computer system, wherein the alert is associated with a second log in window;
determining an access restriction associated with a user associated with the smart card and permitting use of the computer system subject to the access restriction when the smart card is being used as a part of the login protocol;
denying access to the computer system when the access restriction is not met;
setting a timer to measure a time period whenever use of the computer system is permitted;
resetting the timer when the computer system is actively being used; and
carrying out an automatic logout when the computer system has not been actively used during the time period; and
wherein the use logging comprises making entries into a log file of a user name, time and date of computer system use.

15. A computer system having an access control system, comprising:
a central processor;
a smart card reader accessible by the central processor;
a security program running on the central processor that:
receives a first request to log into the computer system;
determines if a smart card is being used as a part of a login protocol to log in to the computer system;
if the smart card is being used, permitting use of the computer system based on access restrictions embedded on the smart card and logging use of the computer for the user associated with the smart card; and
if the smart card is not being used, permitting use of the computer system, logging use of the computer system to an unknown user, and setting an alert on the computer system, wherein the alert is viewable when receiving a second request to log into the computer system.

16. The apparatus according to claim 15, wherein the alert comprises changing a visual appearance of an icon.

17. The apparatus according to claim 15, wherein the security program further determines an access restriction associated with a user associated with the smart card and permits use of the computer system subject to the access restriction when the smart card is being used as a part of the login protocol, and denies access to the computer system when the access restriction is not met.

18. The apparatus according to claim 15, wherein the security program also:
sets a timer to measure a time period whenever use of the computer system is permitted;
resets the timer when the computer system is actively being used; and
carries out an automatic logout when the computer system has not been actively used during the time period.

19. The apparatus according to claim 15, wherein the use logging comprises making entries into a log file of a user name, time and date of computer system use.

* * * * *